United States Patent Office 2,911,342
Patented Nov. 3, 1959

2,911,342

MANUFACTURE OF BENZENE HEXACHLORIDE

Frederick E. Kung, Akron, Ohio, assignor to Columbia-Southern Chemical Corporation, Allegheny County, Pa., a corporation of Delaware No Drawing. Application June 15, 1956
Serial No. 591,523

6 Claims. (Cl. 204—163)

This invention relates to a novel process of producing benzene hexachloride and more particularly pertains to an improved method for promoting the reaction of chlorine and benzene to form benzene hexachloride.

Benzene hexachloride may be prepared by reaction of benzene and chlorine under conditions conductive to additive chlorination of benzene, notably in the absence of a chlorine substitution catalyst such as ferric or aluminum chloride. In the past, the additive chlorination reaction has been facilitated by actinic irradiation, usually light about 2500 A. to 4500 A. in wave length, and other catalytic agents such as organic peroxides.

Actinic irradiation by far is the most commercially utilized promoter or catalytic agent for the reaction. This is so despite certain less desirable features of actinic light irradiation. In conjunction with processes favoring high gamma-benzene hexachloride yields, these shortcomings are quite pronounced.

A less desirable feature of actinic irradiation is its decreasing catalytic efficiency observed as solid benzene hexachloride forms in the reaction medium. Since in the chlorination of benzene, any substantial conversion of benzene to benzene hexachloride forms solid benzene hexachloride this detracts from the usefulness of actinic irradiation. In addition, actinic irradiation adds heat to the reaction medium. Rather careful temperature control of the reaction medium, e.g. heat removal, is required for proper operation of the process. The heat added by actinic irradiation imposes an additional burden on the refrigeration system. This added refrigeration burden is particularly acute in processes operated at low temperatures, usually below 5° C. and often within the range of from 0° C. to minus 40° C.; highest gamma yields are realized by processes conducted at low temperatures.

According to this invention, reaction of chlorine and benzene to provide benzene hexachloride is promoted or catalyzed by subjecting the reaction medium to gamma rays, such as the emissions of radioactive isotopes of various elements. Typical radioactive isotopes of elements include cobalt 60 and cesium 137. Other radioactive isotopes of elements which have half lives ranging from several days to 30 or 50 years may be used. Such gamma emissions are especially effective under conditions where other catalytic irradiations are deficient for one or more reasons. These gamma rays are of extremely high energy content and generally are from 1.4 A. to 0.01 A. in wave length.

The contemplated gamma emissions of radioactive isotopes provide superior results because of this tremendously high energy content they possess. In this regard, they differ from rays produced by impact of beta rays against a solid.

For gamma rays to be utilized in a commercially significant manner, the intensity of the gamma irradiation must be such that at least about 2 percent conversion of the available benzene is converted to product within a convenient time period, for the most part within about an hour. Much higher benzene conversion is desirable, particularly in conjunction with embodiments hereinafter described.

Gamma rays emitted from a 1 curie source catalyze or promote the chlorination of 0.065 mole of benzene per hour. Accordingly, the radiation of a mixture of benzene with gamma rays emitted from a 1 curie source for an hour will produce approximately 5 grams (0.065 mole) of benzene hexachloride, while the gamma rays emitted from a 2 curie source will catalyze the production of twice that quantity of benzene hexachloride in one hour. With a reaction mixture containing 10 moles of benzene, substantially similar benzene hexachloride yields are obtained by gamma rays emitted from a 10 curie source for one hour or with the gamma ray emissions from a 5 curie source for two hours. Yields of benzene hexachloride are accordingly controlled by varying the size and curies of the source and/or the length of irradiation as above discussed.

Thus, irradiation with gamma rays of reaction mixture containing 1 mole of benzene from a 1 curie source for about 20 minutes will catalyze the conversion of about 0.02 mole of benzene, or in other words, some 2 percent by weight of the available benzene. The gamma ray emissions from smaller curie sources while operative promote the reaction at a considerably slower rate. For this reason, sources of gamma emission are usually a minimum of 10 to 100 curies in rating.

The foregoing discussions correlating the moles of benzene hexachloride provided by the catalytic properties of given sources of gamma ray emissions is premised on the complete utilization of the gamma rays by the reaction mixture. In practice, the percentage of gamma rays directed into the reaction mixture that is absorbed and consequently catalytically effective is related to the intensity of the irradiation and the length of the path the rays travel through the reaction mixture. The intensity of the gamma ray will vary depending on the radioactive isotope itself. The higher the intensity, the stronger the penetrative power of the gamma ray emission. A gamma ray source with an intensity of 1,000,000 electron volts does not have the penetrative power of the source with an intensity of 2,000,000 electron volts. Accordingly, the length of the path the gamma rays travel through the mixture must be greater for gamma irradiations of higher intensities to absorb and utilize the irradiation efficiently.

The presence of solid benzene hexachloride in the reaction mixture improves the catalytic efficiency of the gamma rays in promoting benzene hexachloride formation. With a substantial solid phase in the benzene-containing reaction mixture, the productivity of a given gamma emission directed into the reaction mixture is substantially greater than if solid phase is absent. Thus, gamma rays as herein contemplated function with high efficiency at conditions under which the catalytic effectiveness of actinic irradiation is minimized, e.g. in the presence of solids in the reaction mixture.

In performance of this invention, a mixture of chlorine and benzene is subjected to the action of (irradiated with) gamma ray emissions of radioactive isotopes while the reaction medium contains a substantial solid phase of benzene hexachloride, as when the degree of benzene conversion is in excess of 10 to 15 weight percent. While it is preferable such solid phase be present throughout the period of irradiation, advantages are realized when it is present during a major portion of the period, e.g. at least 65 percent of the irradiation period. By so operating with a reaction medium in slurry state, the problem of decreasing catalytic activity encountered with use of actinic irradiation is obviated and, what is more, the gamma rays are effectively utilized under optimum conditions. Depending upon the exact temperature and composition of the reaction medium, the degree of benzene conversion above about 10 percent necessary to insure a substantial solid phase and hence, important to the provision of conditions under which gamma ray activation is especially valuable will vary.

At temperatures of 5° C. to 60° C., a reaction slurry comprised of benzene and benzene hexachloride and containing substantial solid phase involves conversion of upwards of 15 to 18 percent of the benzene. If the reaction medium includes an inert diluent in which benzene hexachloride is less soluble than in benzene, even lower conversions give rise to a solid phase. It is found, therefore, that at these temperatures benzene conversions preferably of 30 to 50 or 60 percent, or even higher, up to 90 to 95 percent are used so long as the reaction mixture remains fluid. The requisite fluidity of the reaction medium usually constitutes the primary limitation upon the maximum degree of benzene conversion. Benzene conversions herein practiced and the solid concentration in the reaction medium are usually restricted to slurries which are agitated readily and are transportable through piping or other such equipment.

At lower temperatures, such as below the freezing point of benzene to as low as minus 60° C. or minus 80° C., the promotion of additive chlorination of benzene by irradiation with gamma rays has additional advantages. The reaction is conducted at these low temperatures by incorporating an inert benzene solvent in the reaction mixture to form a lower freezing point eutectic solution. The solubility of benzene hexachloride in benzene decreases with lowered temperatures and many of the solvents admixed with the benzene have a lower benzene hexachloride solubility than benzene. Accordingly, at these lower temperatures, the formation of a solid phase occurs at even lower benzene conversions than at high reaction temperatures.

As will hereinafter be described and further detailed, processes conducted at these lower temperatures offer generally improved gamma isomer yields under certain specified conditions. Thus, a suitable catalytic agent or reaction promoter which facilitates the efficient, economic operation at these lower temperatures is most desirable. At those temperatures which are conducive to manufacture of enhanced gamma isomer containing products, actinic irradiation is at a disadvantage as a catalytic agent by comparison with the herein employed gamma rays. At these lower temperatures, the heat generated by the actinic irradiation source oppressively burden the refrigeration system needed for low temperature control. Being exothermic, the removal of heat of reaction represents itself sizable refrigeration costs.

As a solid phase appears in the reaction medium at these low temperatures, the decreasing efficiency of the actinic irradiation requires either accepting a markedly reduced reaction rate or increasing the intensity of actinic irradiation. As the intensity is raised, however, to offset declining reaction rates, the heat generated in the reaction medium by the actinic light increases further adding to the refrigeration load. By the use of gamma rays, production of benzene hexachloride by reaction of chlorine and benzene is improved at low temperatures, e.g. below about 5° C., and other conditions conducive to the formation of enhanced gamma isomer yields.

In conjunction with the low temperature reaction of chlorine and benzene, optimum gamma isomer yields require adherence to several other reaction conditions. Thus, in the reaction medium free chlorine is maintained in concentrations of 0.001 to 1.5 percent by weight of the solution which is maintained below 5° C. The particular solvents present with the benzene must be ones which have a dielectric constant of at least about 4 at 20° C. Some such solvents include methylene chloride, chloroform, methyl chloride, methylene chloroform, or like partially halogenated hydrocarbons. More complete details of a process designed for the production of optimum gamma isomer products is disclosed in the application of Neubauer et al., Serial No. 225,854, filed May 11, 1951, now abandoned in lieu of United States Letters Patent 2,717,238, granted September 6, 1955.

One method of utilizing gamma ray promotion of benzene and chlorine reaction to best advantage is by passing predetermined relative quantities of benzene and elemental chlorine (gas or liquid) continuously into a reaction zone subjected to gamma rays. If found expedient, the chlorine may be dissolved in the benzene and fed as such mixture. The reaction zone is sufficiently large such that there is a certain holdup period during which the reaction mixture is in the zone and subjected to the gamma rays. By initially establishing in the reaction zone a reaction medium containing the predetermined degree of benzene conversion, notably a degree of benzene conversion which provides for a substantial solid phase, say a 30 to 40 percent benzene conversion, the feeds and withdrawal rates are correlated to maintain an essentially constant condition in the zone. Thus, the gamma rays promote the reaction in a medium having a sizable solids content, a condition at which gamma rays most effectively and efficiently operate.

If desired to operate such continuous process at temperatures substantially below the freezing point of benzene, say from 5° C. to minus 60° C., a solvent such as hereinbefore described is included as a component in the reaction medium. The concentration of free chlorine in the reaction mixture may be controlled within the range suitable for optimum gamma isomer yields by analyzing the contents of the mixture and adjusting the feed of chlorine in response to such analysis.

It is preferable to dispose the source of gamma rays, notably the radioactive isotopes, as near as feasible to the geometric center of the reaction zone. As far as practical the source should be surrounded by the reaction mixture. Better utilization of the gamma rays is provided.

The following examples illustrate the manner in which the invention may be practiced:

EXAMPLE I

A 500 cubic centimeter round bottom, three-necked flask is fitted with a water cooled condenser, an electrically driven, ground glass, sealed, propeller type glass stirrer, and an elongated connection which serves as a chlorine inlet tube and entrance for a minus 100° centigrade to 50° centigrade thermometer.

Three moles (235 grams) of benzene are added to the reaction flask and chlorine gas addition is commenced. Immediately prior to the addition of chlorine several glass beads which contain radioactive sodium are placed in the flask. These radioactive beads are prepared by deuteron irradiations from a cyclotron and are believed to be a 1 curie source of radioactivity. The chlorine is added at the rate of 0.72 gram per minute. At the end of 91 minutes, when 65.5 grams (0.97 mole) of chlorine has been added, chlorine addition is discontinued.

The resulting reaction mixture is then heated to 139° centigrade in two hours, without stirring. Most of the excess benzene is distilled off in this manner. The solid is then dried in a vacuum desiccator which solid is benzene hexachloride.

EXAMPLE II

The same apparatus and procedure is used as in Example I except that canned radioactive fission products produced by fission of uranium, plutonium and other fissionable isotopes are used as the source of gamma rays. A well is provided in the side of the reaction flask to receive a vial containing such materials. The walls of the well and vial are of such materials (e.g. glass) and thickness (e.g. ⅛ inch) so as to permit passage of gamma and beta radiations. Benzene hexachloride is produced.

EXAMPLE III

The same apparatus and procedure is used as in Example I, except that a 10 to 15 curie cobalt 60 source is positioned in a well therefor in the side of the reaction flask. Benzene hexachloride is produced.

EXAMPLE IV

A reactor charged with 1700 grams of a mixture consisting of 70 percent by weight methylene chloride and 30 weight percent benzene is cooled externally until the mixture is at minus 15° C. Dry nitrogen is passed into the reaction mixture for an hour whereafter sufficient chlorine gas is metered into the mixture to provide an average integrated free and unreacted chlorine concentration of 0.6 percent by weight during the reaction.

This reactor is subjected to gamma irradiation from a cobalt 60 source at a dose rate of 3000 roentgens equivalent physical (REP) per minute for 84 minutes. The total dose is 252 kilo REP. Approximately 25.7 percent yield of benzene hexachloride on a benzene basis is realized. The product, after separating unreacted benzene and methylene chloride by distillation is analyzed by infrared technique for its isomer distribution. It contains 53.7 percent alpha, 19.6 percent gamma, 12.1 percent delta and 9.0 percent epsilon.

EXAMPLE V

The reactor comprises a tubular structure of three concentric tubes, the large outside tube serving as the reactor while the smaller inside tubes provide inlets for chlorine and nitrogen. A vent is provided for the large outside tube and is connected to a gas sample bottle; the samples are analyzed for oxygen content by mass spectrography. The desired quantity of benzene and methylene chloride (see table below) is charged and the reactor brought to and maintained at the desired temperature by circulating cold methanol in a metal jacket surrounding the reactor.

Nitrogen is passed through both the chlorine and nitrogen inlet tubes to purge the charge. This nitrogen is passed through a tube of hot copper turnings to remove oxygen. After the purge, chlorine replaces nitrogen fed through the chlorine inlet and the feed continues until the desired chlorine concentration level in the charge is attained. At this time, the contents of the mixture are subjected to a cobalt 60 gamma ray source while the chlorine flow continues at the specified rate for the designated time. The total irradiation dose is about 53.4 kilo roentgens equivalent physical per hour. The benzene hexachloride so produced is analyzed by infrared spectroanalysis for its isomer contents.

The following table summarizes the reaction conditions and results:

*Table I*

| $C_6H_6$ | Charge (Milliliters) $CH_2Cl_2$ | Chlorine Feed Rate (Grams per Minute) | Length of Irradiation (Minutes) | Reaction Temperature, 0° C. | Chlorine Concentration (Weight Percent of Solvent and Benzene) | Oxygen in Vent Gas, Weight Percent | Total Product, Grams | Product—Benzene Hexachloride | | | | |
|---|---|---|---|---|---|---|---|---|---|---|---|---|
| | | | | | | | | α | β | γ | Δ | ε |
| 30.3 | 79.8 | 0.262 | 99.46 | −40 | 0.452 | 0.8 | 35.1 | 57.5 | 9.0 | 19.9 | 10.3 | 1.3 |
| 30.3 | 79.8 | 0.122 | 98.35 | −40 | 0.2685 | 0.03 | 16.2 | 55.6 | 7.0 | 27.0 | 8.3 | 1.0 |
| 33.3 | 76.6 | 0.258 | 100 | −15 | 0.910 | 0.04 | 35.8 | 64.4 | 6.6 | 21.9 | 7.6 | 0.0 |
| 33.3 | 76.6 | 0.285 | 100 | −15 | 1.069 | 0.09 | 37.2 | 61.0 | 8.3 | 22.2 | 9.3 | 0.6 |
| 33.3 | 76.6 | 0.218 | 80 | −15 | 0.434 | 0.434 | 23.6 | 64.0 | 5.7 | 23.3 | 8.0 | 0.0 |
| 33.3 | 76.6 | 0.234 | 45 | −15 | 0.355 | 0.355 | 14.3 | 63.4 | 6.0 | 22.6 | 8.0 | 0.0 |

The benzene hexachloride is as a fluid slurry which includes unreacted benzene and a solvent when the latter is used. Both solid and dissolved benzene hexachloride are present. Simple distillation of the slurry usually at reduced pressure volatilizes both benzene and solvent, leaving benzene hexachloride residue in molten state. By cooling, it is solidified whence it can be flaked or otherwise subdivided into commercial form for packaging.

According to a further embodiment hereof, the reaction slurry subsequent to concluding the reaction is treated to remove the solid phase, as by filtration, centrifugation or like mechanical expedient. By so removing the solid phase of the slurry, benzene hexachloride of especially high gamma concentration is recovered from the solid free liquid.

Benzene hexachloride produced by gamma ray activated additive chlorination of benzene in accordance with this invention apparently contains the five isomers of benzene hexachloride in proportions which differ from those found in benzene hexachloride produced otherwise. The concentration of epsilon isomer, for example, is present in decidedly reduced amounts and often is not detected by infrared analytical techniques. The different isomer distribution apparently contributes to obtention of the exceptionally high gamma containing product present in the liquid phase.

Efficient recovery of gamma isomer in this embodiment entails restricting the gamma produced by the reaction to presence in the liquid phase. An operation in which 85 percent or more of the gamma is dissolved in the liquid permits efficient processing. For both efficient recovery of gamma and optimum gamma concentration in the product, the liquid phase should also be essentially saturated with gamma isomer.

In conjunction with this embodiment and reactions conducted at temperatures below 5° C. in the presence of a solvent such as methylene chloride, it often is advisable to remove the solvent, as by topping distillation, and thence adjust the temperature and benzene concentration to achieve one or more of the above more desired conditions. This entails cooling the distillation residue, usually slowly as at a rate of 2 to 20° C. per hour until the slurry is at between 10° C. and 30° C. Additional benzene may be added should more or all of the benzene have been removed with the solvent, or in the event there is insufficient benzene available to dissolve 85 percent or more of the gamma isomer. The latter condition arises when extremely high benzene conversions are practiced, e.g. when in excess of 50 percent of available benzene is converted to benzene hexachloride.

This application is a continuation-in-part of my prior application Serial No. 283,758, filed April 22, 1952, now abandoned.

Although the present invention has been described in terms of specific details of certain embodiments thereof, it is not intended that the invention be construed as limited thereto except insofar as such details appear in the appended claims.

What is claimed:

1. The method which comprises irradiating with gamma ray emissions of a radioactive isotope a liquid slurry of chlorine, benzene and benzene hexachloride at from minus 80° C. to 60° C., reacting the chlorine and benzene to form benzene hexachloride, promoting said reaction with the gamma ray emissions and maintaining a substantial solid benzene hexachloride content in the slurry during at least a major portion of the irradiation period whereby to increase the catalytic efficiency of the emissions, the intensity of the gamma irradiation being sufficient to convert at least about two percent of the available benzene to benzene hexachloride in one hour said solid benzene hexachloride content maintained in the slurry being equivalent to the solid content provided by converting at least 10 weight percent of benzene to benzene hexachloride at the reaction temperature but below the content at which the slurry is no longer fluid.

2. The method which comprises feeding elemental chlorine and benzene into a liquid slurry of chlorine, benzene and benzene hexachloride at minus 80° C. to 60° C., reacting chlorine and benzene in the slurry to form further benzene hexachloride, promoting the reaction by irradiation of the slurry with gamma ray emissions of a radioactive isotope and maintaining a substantial solid benzene hexachloride content in the slurry whereby to increase the catalytic efficiency of the said gamma ray emissions, the intensity of the gamma irradiation being sufficient to convert at least about two percent of the available benzene to benzene hexachloride in an hour said solid benzene hexachloride content maintained in the slurry being equivalent to the quantity of solid provided by converting at least 10 weight percent of benzene to benzene hexachloride at the reaction temperature but below the concentration at which the slurry is no longer fluid.

3. A method which comprises continuously feeding elemental chlorine and benzene into a reaction zone, establishing therein a liquid slurry of chlorine, benzene and benzene hexachloride at minus 80° C. to 60° C. containing a substantial solid benzene hexachloride content, irradiating the liquid slurry with gamma ray emissions of a radioactive isotope, reacting chlorine and benzene in the zone to form benzene hexachloride, said reaction being catalyzed by the gamma ray emissions, the intensity of which are sufficient to convert two percent of the benzene in said zone to benzene hexachloride in an hour continuously withdrawing a liquid slurry of benzene and benzene hexachloride containing solid benzene hexachloride from the zone, the holdup time in said zone being such that at least 10 weight percent of the fed benzene is converted to benzene hexachloride thereby maintaining a benzene hexachloride solids content in said zone which enhances the catalytic efficiency of the gamma ray emissions.

4. The method of claim 3 wherein the liquid slurry is below 5° C. and above minus 80° C. and an inert solvent for benzene which forms a lower freezing point eutectic solution of benzene is included in the reaction medium.

5. The method of claim 4 wherein the inert solvent has dielectric constant of at least 4 at 20° C.

6. The method of claim 3 wherein the reaction medium surrounds the radioactive isotope emitting the gamma rays.

References Cited in the file of this patent

UNITED STATES PATENTS

| | | |
|---|---|---|
| 2,218,148 | Hardie | Oct. 15, 1940 |
| 2,524,970 | Gouze | Oct. 10, 1950 |
| 2,713,076 | Ellsworth et al. | July 12, 1955 |

FOREIGN PATENTS

| | | |
|---|---|---|
| 565,356 | France | Jan. 25, 1924 |